United States Patent
Sawicki et al.

(10) Patent No.: US 11,415,377 B2
(45) Date of Patent: Aug. 16, 2022

(54) TWO-STAGE FRACTAL HEAT EXCHANGER

(71) Applicant: Hamilton Sundstrand Corporation, Charlotte, NC (US)

(72) Inventors: Piotr Sawicki, Bogdaniec (PL); Adam Horoszczak, Wrocław (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 30 days.

(21) Appl. No.: 17/021,047

(22) Filed: Sep. 15, 2020

(65) Prior Publication Data

US 2021/0190443 A1 Jun. 24, 2021

(30) Foreign Application Priority Data

Dec. 23, 2019 (EP) .................................. 19461620

(51) Int. Cl.
*F28F 9/02* (2006.01)
*F28D 1/047* (2006.01)
*F28F 1/00* (2006.01)

(52) U.S. Cl.
CPC .......... *F28F 9/0275* (2013.01); *F28D 1/0475* (2013.01); *F28F 1/006* (2013.01); *F28F 2210/02* (2013.01)

(58) Field of Classification Search
CPC .. F28F 7/1661; F28D 7/16; F28D 2021/0021; F28D 7/0016; F28D 7/0008; F28D 1/0475; F28F 9/0275; F28F 7/02; F28F 13/08; F28F 9/0273; F28F 1/006; F28F 2210/02

USPC ......................................................... 165/145
See application file for complete search history.

(56) References Cited

U.S. PATENT DOCUMENTS

| 1,884,778 | A | | 10/1932 | Lucke et al. |
| 3,205,939 | A | | 9/1965 | Huet |
| 3,229,762 | A | * | 1/1966 | Vollhardt ............... F28D 7/005 165/157 |
| 4,739,826 | A | * | 4/1988 | Michelfelder .......... F28D 19/02 165/145 |

(Continued)

FOREIGN PATENT DOCUMENTS

| WO | 2004097323 A1 | 11/2004 |
| WO | 2011115883 A2 | 9/2011 |
| WO | 2018024765 A1 | 2/2018 |

OTHER PUBLICATIONS

European Search Report for Application No. 19461620.7, dated Jun. 30, 2020, 7 pages.

*Primary Examiner* — Jon T. Schermerhorn, Jr.
(74) *Attorney, Agent, or Firm* — Cantor Colburn LLP

(57) ABSTRACT

A multiple-stage fractal heat exchanger includes two or more first fluid flow paths arranged adjacent to one another. Each first fluid flow path is defined by a main inlet channel on one side which diverges into two or more smaller channels to form a central first fluid flow path. In each of the two or more first fluid flow paths. The two or more smaller channels converge away from the central first fluid flow path into a main outlet channel on an opposite side of the first fluid flow path to the main inlet channel. The main outlet channel of each of the two or more first fluid flow paths is configured to be connected to the main inlet channel of an adjacent first fluid flow path.

7 Claims, 4 Drawing Sheets

(56) References Cited

U.S. PATENT DOCUMENTS

| | | | | |
|---|---|---|---|---|
| 6,957,630 | B1* | 10/2005 | Mastronarde | F22B 37/14 122/451 S |
| 7,270,086 | B2* | 9/2007 | Franke | F22B 1/1815 122/1 B |
| 7,281,499 | B2* | 10/2007 | Franke | F22B 35/14 122/406.5 |
| 7,963,097 | B2* | 6/2011 | Mastronarde | F28F 9/0275 60/682 |
| 9,656,212 | B2* | 5/2017 | DiBiasio | B01D 63/088 |
| 10,088,250 | B2 | 10/2018 | Turney | |
| 2009/0274549 | A1* | 11/2009 | Mitchell | F01D 5/186 415/115 |
| 2012/0199327 | A1* | 8/2012 | Gaiser | F28F 1/32 165/160 |
| 2013/0206374 | A1* | 8/2013 | Roisin | F28D 21/0012 165/165 |
| 2015/0184953 | A1* | 7/2015 | Lee | F28D 1/05341 165/96 |
| 2017/0248372 | A1* | 8/2017 | Erno | F28D 9/0012 |
| 2017/0328644 | A1* | 11/2017 | Takahashi | F28F 3/00 |
| 2018/0283794 | A1 | 10/2018 | Cerny et al. | |
| 2018/0283795 | A1 | 10/2018 | Cerny et al. | |
| 2018/0345754 | A1 | 12/2018 | Gruenwald et al. | |

\* cited by examiner

TWO-STAGE FRACTAL HEAT EXCHANGER

FOREIGN PRIORITY

This application claims priority to European Patent Application No. 19461620.7 filed Dec. 23, 2019, the entire contents of which is incorporated herein by reference.

BACKGROUND OF THE INVENTION

Owing to recent developments in the field of additive manufacturing, even more complex geometries of heat exchangers are becoming industrially and commercially viable. Increases in the flexibility in the design and construction of heat exchangers allow for more favourable and tailorable characteristics of heat exchange, which vary depending on desired applications and purposes. Some new research in this field is directed towards the observation of natural structures which can be mimicked in heat exchanger configurations in order to provide greater flow/heat exchange efficiency or tuneable heat exchange characteristics. One area of this emerging technology utilises fractal-type connecting structures in heat exchanger whereby heat exchange channels divide into two or more smaller channels, which then also divide, and so on. In contrast to classic designs consisting of tanks and tubes, the fractal shape allows direct injection of flow from one main channel into the subsequent plurality of smaller channels/tubes, lowering pressure drop of the flow therebetween. Tanks and headers can be eliminated to achieve a structure consisting almost entirely of tubes, which exhibit high pressure stress resistance. As such, thinner walls can be used which reduce the overall weight of the heat exchanger. One of the problems, however, associated with this construction is that, in a cross-flow configuration, the coldest part of the cold flow inlet meets the hottest part of the hot flow inlet at the thin-walled fractal channels/tubes. This high thermal gradient creates high thermal stress peaks in this area. High thermal stress peaks can cause damage or failure of the smaller tubes, particularly due to the relatively thin walls used. One of multiple objectives of the present invention is to provide a heat exchanger configuration which reduces such thermal gradients, thereby alleviating thermal stresses, without compromising overall heat exchange performance.

SUMMARY OF THE INVENTION

According to one aspect, there is described a multiple-stage fractal heat exchanger. The multiple-stage fractal heat exchanger comprises two or more first fluid flow paths arranged adjacent to one another. Each first fluid flow path is defined by a main inlet channel on one side which diverges into two or more smaller channels to form a central first fluid flow path. In each of the two or more first fluid flow paths, said two or more smaller channels converge away from the central first fluid flow path into a main outlet channel on an opposite side of the first fluid flow path to the main inlet channel. The main outlet channel of each of the two or more first fluid flow paths is configured to be connected to the main inlet channel of an adjacent first fluid flow path.

In some examples, the main inlet channel of each first fluid flow path may be on an opposite side to the main inlet channel of the one or more adjacent first fluid flow paths.

In some examples, the central first fluid flow path may comprise a length of a fixed number of channels extending parallel to one another.

In some examples, the number of channels in the central first fluid flow path of each of the two or more first fluid flow paths is variable.

In some examples, the number of channels in the central first fluid flow path of each of the two or more first fluid flow paths is constant.

In some examples, the main outlet channel of each first fluid flow path is connected to the main inlet channel of an adjacent first fluid flow path via a bent duct.

In some examples, the two or more first fluid flow paths are enclosed in a shell, defining a second fluid flow path.

In some examples, the second fluid flow path extends at an angle to the longitudinal axis of the two or more first fluid flow paths.

In some examples, the second fluid flow path is perpendicular to the longitudinal axis of the two or more first fluid flow paths.

In some examples, the connected two or more first fluid flow paths may form a multiple-stage fractal heat exchanger with one main inlet and one main outlet. The direction of the second fluid flow path may be defined such that it contacts the first fluid flow path whose main outlet channel is also the main outlet of the multiple-stage fractal heat exchanger. The two or more first fluid flow paths may be hot fluid flow paths and the second fluid flow path may be a cold fluid flow path.

According to another aspect, there is described a heat exchanger system comprising two or more multiple-stage fractal heat exchangers as defined in any of the examples of the first aspect arranged side by side, wherein a shell encloses all of the two or more multiple-stage fractal heat exchangers defining a second fluid flow path extending continuously through each of the two or more multiple stage fractal heat exchangers.

In some examples, the second fluid flow path extends at an angle to the longitudinal axis of the two or more first fluid flow paths of the two or more multiple-stage fractal heat exchangers.

In some examples, the second fluid flow path is perpendicular to the longitudinal axis of the two or more first fluid flow paths of the two or more multiple-stage fractal heat exchangers.

In some examples, the connected two or more first fluid flow paths may form a multiple-stage fractal heat exchanger with one main inlet and one main outlet. The direction of the second fluid flow path may be defined such that it contacts the first fluid flow path whose main outlet channel is also the main outlet of the multiple-stage fractal heat exchanger. The two or more first fluid flow paths may be hot fluid flow paths and the second fluid flow path may be a cold fluid flow path.

According to another aspect, there is described a method of manufacture of a multiple-stage fractal heat exchanger. The method comprises forming two or more first fluid flow paths to include a main inlet channel on one side which diverges into two or more smaller channels to form a central first fluid flow path. The method further comprises, in each of the two or more first fluid flow paths, forming said two or more smaller channels to converge away from the central first fluid flow path into a main outlet channel on an opposite side of the first fluid flow path to the main inlet channel. The method further comprises arranging said two or more first fluid flow paths adjacent to one another. The method further comprises connecting the main outlet channel of each first fluid flow path to the main outlet channel of an adjacent first fluid flow path.

DETAILED DESCRIPTION

Figure 1:
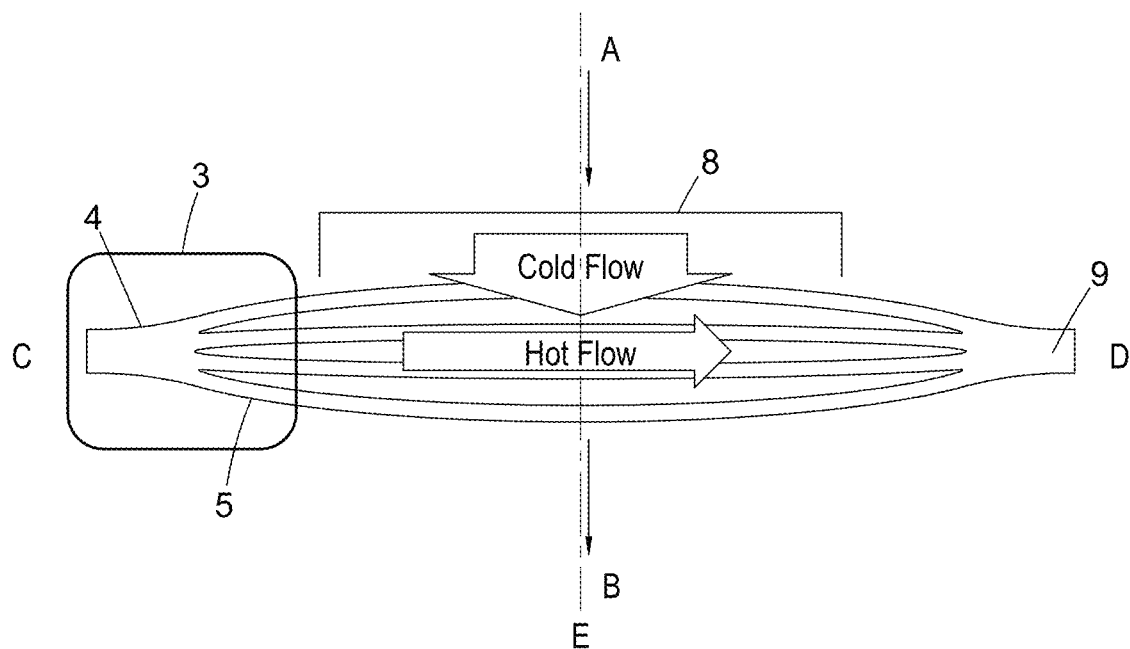
FIG. 1 shows an example of a fractal heat exchanger cross-flow configuration.
Figure 4:
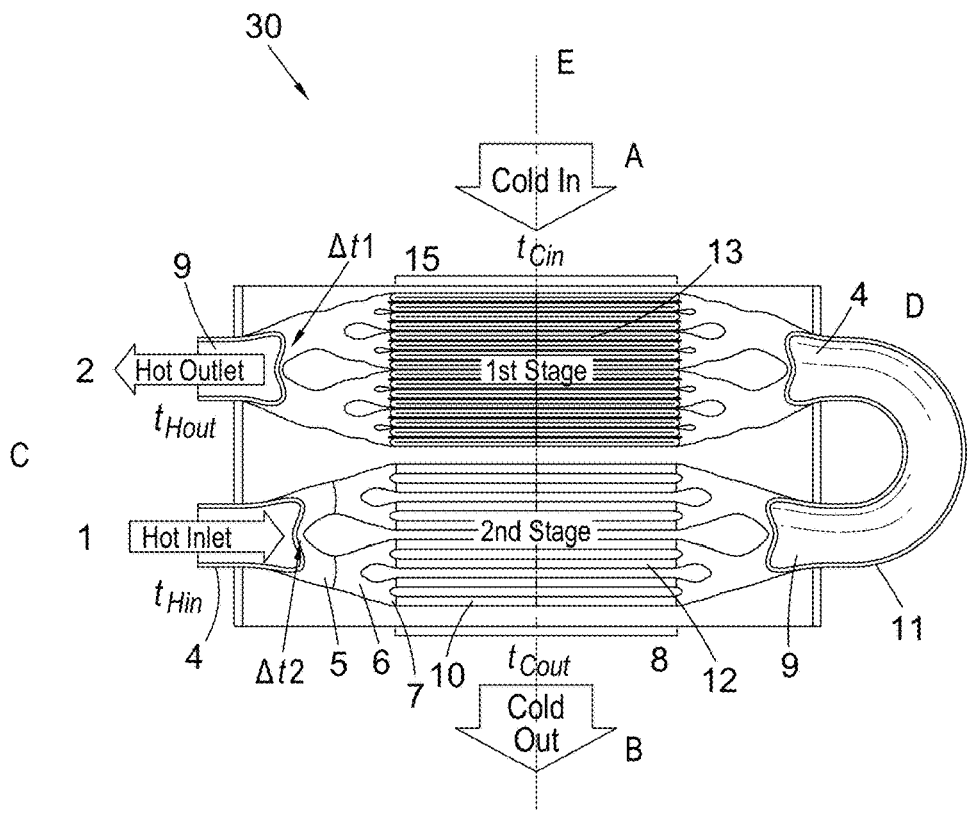
FIG. 4 shows a cross-sectional birds-eye view of the two-stage fractal heat exchanger cross-flow configuration.

FIG. 1 shows an example of a fractal connecting structure of a heat exchanger. As denoted by reference numeral 3, the term fractal here describes the repeated divisional structure of the heat flow channels. One main channel 4 divides into one or more subsequent channels 5. Although not shown in this figure, each of the smaller subsequent channels 5 can further divide into even smaller channels in the same fashion as the main channel 4. This division occurs once or is repeated an indefinite number of times. Fractal design heat flow channels with more than one division stage can be seen in FIG. 4 which illustrates the progressively smaller size channels 5, 6 and 7. The invention is not limited to any number of heat flow channel division stages, nor the eventual number of channels. In one example, as shown in FIGS. 1 and 4, when the heat flow channel is divided into a particular number of smaller sub-channels, this number of channels 10 can be fixed across a central portion 8 of the heat exchanger, such that, in this region, the heat exchange flow channels comprise a series of channels 10 arranged in parallel. On the second, opposite side D of the heat exchanger, the small channels converge into larger channels in a mirror-image fractal arrangement as to the first side C, eventually converging into one main channel 9. In this sense, the heat exchanger fractal flow channel arrangement is symmetric across centre line E. In other examples, the flow channel arrangement of the heat exchanger is not symmetric, such that there may be fewer fractal division stages on one side compared to the other, or the channels may converge into fewer, larger channels at a point away from the centre line E. The smaller central flow channels 10 also may or may not converge into a single main channel at one or more of the sides C or D, and may converge into two or more main channels. Furthermore, the heat exchanger may not comprise a central portion 8 comprising channels/tubes 10 arranged in parallel. It is also envisaged that the flow channels divide in stages from the first side C continually until they reach a centre point of the heat exchanger and at this point immediately begin to converge into fewer, larger channels towards the second end D.

Figure 2:
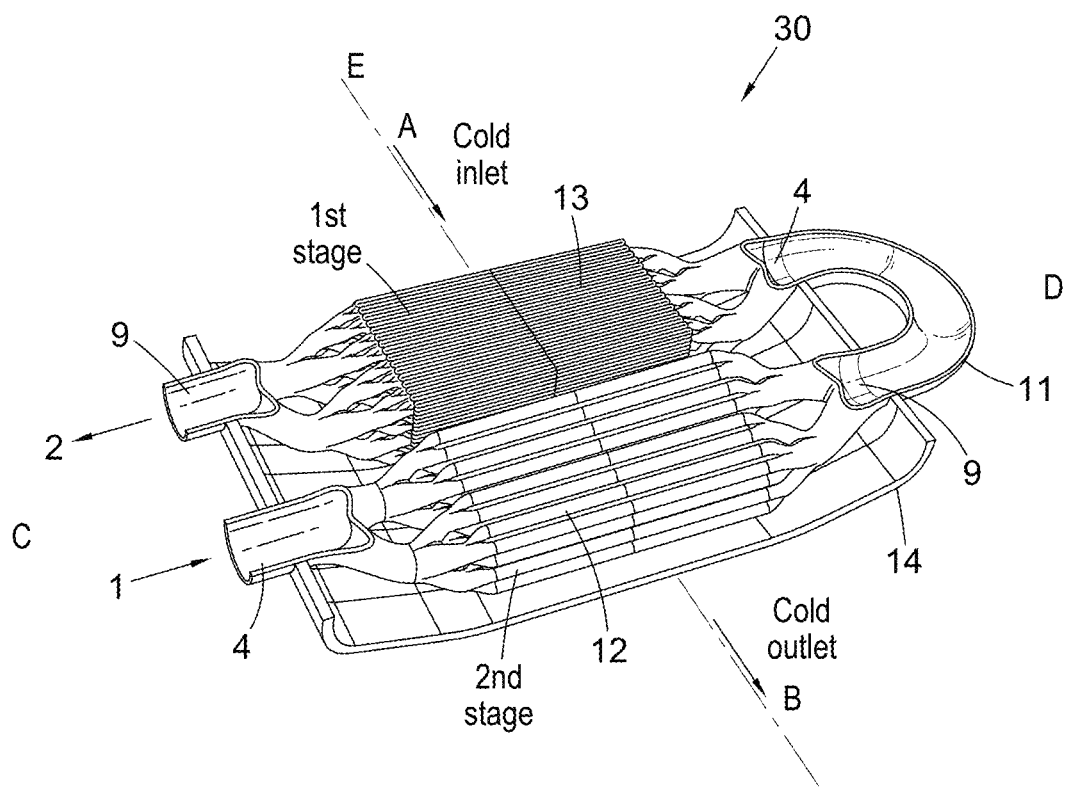
FIG. 2 shows an example of a stacked two-stage fractal heat exchanger cross-flow configuration.
Figure 3:
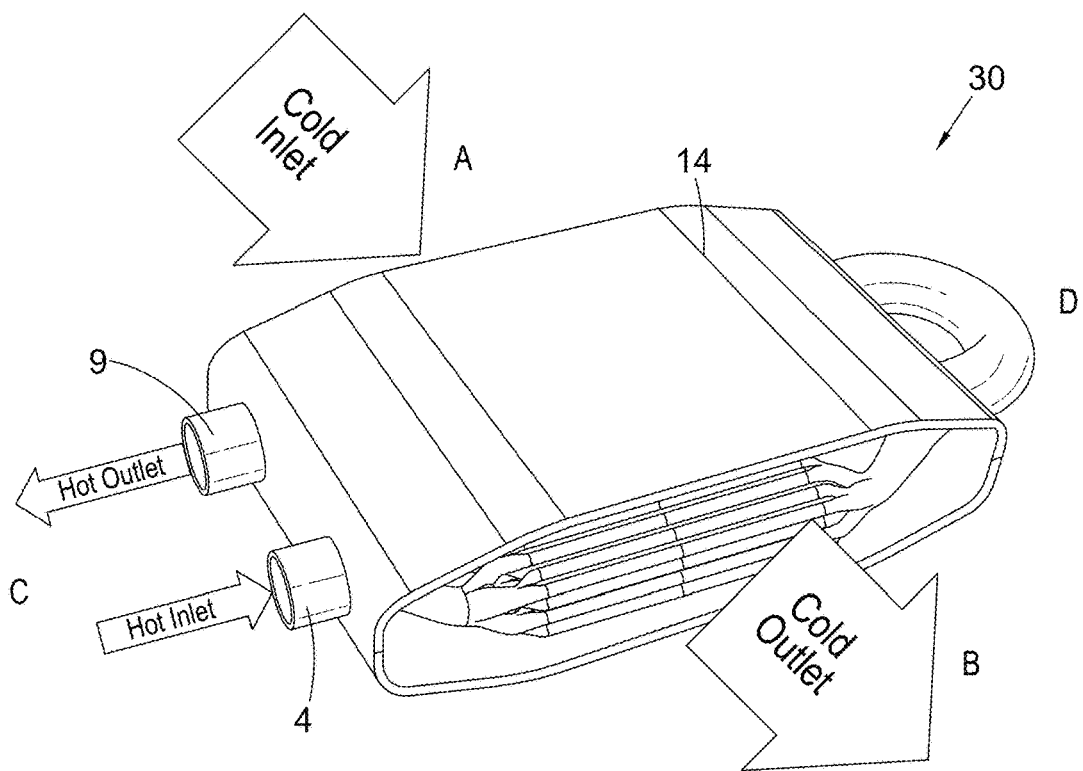
FIG. 3 shows an example of the stacked two-stage fractal heat exchanger configuration in a shell housing.

FIG. 2 shows an example of a two-stage fractal heat exchanger system 30 according to an example of the invention. In this arrangement, two fractal heat exchangers (herein referred to as heat exchanger sections), as described above in relation to FIGS. 1 and 4, are arranged side by side such that the hot fluid flow paths of each heat exchanger are arranged in parallel. The hot fluid flow paths of each of the two heat exchangers are connected by a 180-degree bent duct 11. The bent duct 11 allows hot fluid flow from an inlet 1 in the first heat exchanger section 12 to pass through the first heat exchanger section 12 and subsequently pass through the second heat exchanger section 13 in a direction opposite to the direction of flow through the first heat exchanger section 12. As shown by the arrows A and B, a cold flow passes through the two-stage heat exchanger, external to the tubes of the first and second heat exchanger. The direction of the cold flow may be such that the cold fluid flow from cold inlet A first contacts the second heat exchanger section 13 (first stage) and subsequently contacts the first heat exchanger section 12 (second stage). It will be understood that the hot fluid flow in the second heat exchanger section 13 will be cooler than the hot fluid flow in the first heat exchanger section 12, as the flow will have been cooled somewhat in the second stage of the heat exchanger, due to the heat exchange with the cold flow in the second stage, before passing through the second heat exchanger section 13. Similarly, the fluid in the cold fluid flow in the second stage, contacting the first heat exchanger section 12 will be warmer than the fluid in the cold fluid flow in the first stage, due to the heat exchange taking place beforehand in the first stage, through contact with the second heat exchanger section 13. It will be appreciated that, by virtue of this arrangement, temperature gradients in each stage of the heat exchanger are reduced. The coldest part of the cold flow (in the first stage) only comes into contact with the relatively cooler portion of the hot flow. Similarly, the hottest part of the hot flow (in the second stage) only comes into contact with the relatively warmer portion of the cold flow. This means that at no point in the heat exchanger does the hottest part of the hot flow meet the coldest part of the cold flow, unlike in a traditional one-stage heat exchanger like the one shown in FIG. 1. Such a reduction in thermal gradients within the heat exchanger leads to a decreased risk of failure due to excessive thermal stresses. It will be appreciated that FIG. 2 shows a cross-sectional view of the two-stage heat exchanger such that the inner surfaces of the hot flow inlet 1, the hot flow outlet 2 and the bent duct 11 can be seen. In reality, the complete two-stage heat exchanger would appear as shown in FIG. 3. The shell 14 houses the first and second stage heat exchanger areas such as to contain the cold flow and/or define the cold flow path direction.

FIG. 4 shows an example of the two-stage heat exchanger 30 in a birds-eye cross-sectional view. As can be seen in this figure, the central parallel tube portion 15 of the second heat exchanger section 13 in the first stage comprises more (and smaller) tubes than that of the central portion 8 of the first heat exchanger section 12 in the second stage. This higher number of tubes generally means a higher heat transfer rate due to the increased heat exchange surface area. In this example, therefore, with more heat exchange taking place in the first stage, the thermal stresses in the second stage are even further reduced. It will be understood, however, that the invention is not limited to the number of tubes in the first stage being higher than that in the second stage. In fact, it is envisaged that either the first or second stage may comprise a higher number of tubes, or that the number of tubes in each stage is equal. Using different numbers of tubes in each of the first and second stage can enable a more uniform thermal gradient throughout the heat exchanger. The number of tubes in each stage can be chosen prior to manufacture to tailor/optimise the heat exchange properties and thermal gradients across the different stages of the heat exchanger, accommodating for material properties, constructional configuration (such as number of fractal stages) or desired heat exchange performance characteristics to suit specific applications.

FIGS. 2, 3 and 4 illustrate an example wherein the direction of the cold flow is substantially perpendicular to the directions of the hot flows, such that the relative angle θ between the cold flow path and the hot flow paths is around 90 degrees. It is also envisaged that the directions of the cold flow path and the hot flow paths are not arranged perpendicularly to one another. The relative angle θ can be anywhere from 0.01 degrees to 90 degrees and may be between 50 degrees and 80 degrees. Changing this relative angle emphasises the effect of the multiple-stage nature of the heat exchanger. The angle θ can be chosen to further alter and tailor the heat exchange characteristics and thermal gradient distribution across the heat exchanger.

Figure 5A:
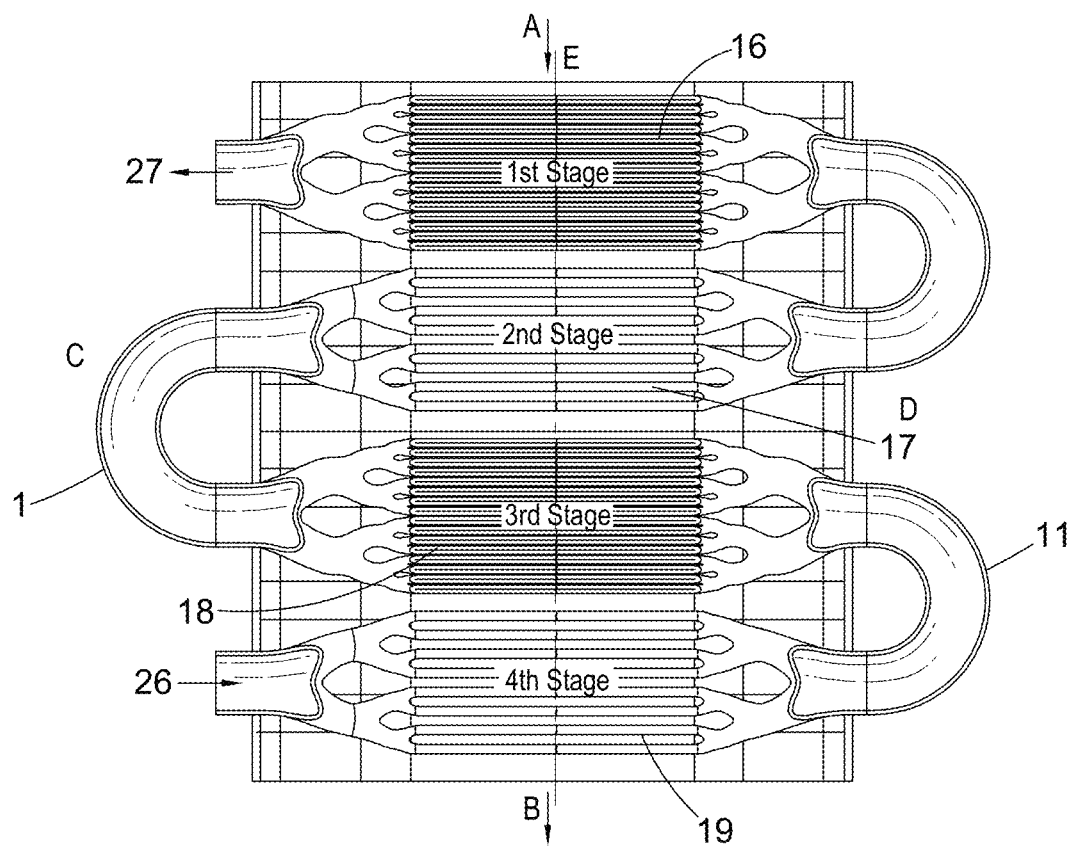
FIG. 5A shows an example of a multiple-stage series fractal heat exchanger.

FIG. 5A shows an example of a multiple-stage fractal heat exchanger system. The example illustrated in FIG. 5A comprises four stages, in contrast to the two stages of the example shown in previous figures. It will however be appreciated that the number of stages can be more or less than four, and be any conceivable number. Much as increasing the number of tubes in one heat exchanger stage increases thermal performance, increasing the total number of stages in the exchanger enables a higher heat transfer rate due to the greater overall heat exchange surface area. FIG. 5A shows a "series" arrangement of heat exchanger stages. This means that each stage is connected to a subsequent stage such that the hot fluid flow, starting from the hot inlet 26 of the first heat exchanger section 19, at the fourth stage, flows consecutively through the second 18, third 17 and fourth 16 heat exchanger sections, through the third, second and first stages respectively. The first heat exchanger section 19 is connected, on side D, to the second heat exchanger section 18 by a bent duct 11, similar to that described in relation to FIGS. 2 to 4. The second heat exchanger section 18 is connected to the third heat exchanger section 17 by a bent duct 11 disposed on side C of the second heat exchanger section 18. This configuration forms an "S" shape hot fluid flow path through the third 17, second 18 and first 19 heat exchanger sections (the second, third and fourth stages). As can be seen from the figure, the third heat exchanger section 17 is connected to the fourth heat exchanger section 16 by another bent duct 11 on side D. The hot fluid flow outlet 27 is then disposed on side C of the fourth heat exchanger section 16 (first heat exchanger stage). It will be appreciated that, rather than the hot fluid flow outlet being disposed on the fourth heat exchanger section 16, this structure can be repeated indefinitely, with any number of heat exchanger stages, with the bent duct connecting each stage being disposed alternately on each of sides C and D after each stage. The hot fluid flow outlet would then be disposed on the final of this number of heat exchanger sections. As denoted by the cold inflow A and outflow B arrows, the cold fluid flow starts at the first exchanger stage and passes consecutively through the second, third and fourth heat exchanger stages. The use of more stages further decreases thermal gradients within the heat exchanger. This is because, by the time the cold flow reaches the fourth heat exchanger stage (the first heat exchanger section 19), it has already been warmed by the heat exchange experienced in the first, second and third stages. This means that, compared to fewer stage systems, the cold flow is relatively warmer when it meets the hottest part of the hot fluid flow, meaning that the thermal gradient in this area is reduced, relieving thermal stress. Similarly, the hot fluid flow has, by the time it reaches the first stage (the fourth heat exchanger section 16), cooled to a further extent, as compared with fewer stage systems, by virtue of the fact it has already passed through the first 19, second 18, and third 17 heat exchanger sections (fourth, third and second stages). Because the hot fluid flow in the first stage is relatively cooler, the thermal gradient in this area, where the cold flow is at its coldest, is considerably reduced. Any of the possible modifications such at varying the number of tubes between heat exchanger sections, modifying fractal symmetry and changing the relative angle of cold and hot fluid flow paths discussed above in relation to the two-stage examples illustrated in FIGS. 2 to 4 are also contemplated to be applicable to the multiple-stage example of FIG. 5A.

Figure 5B:
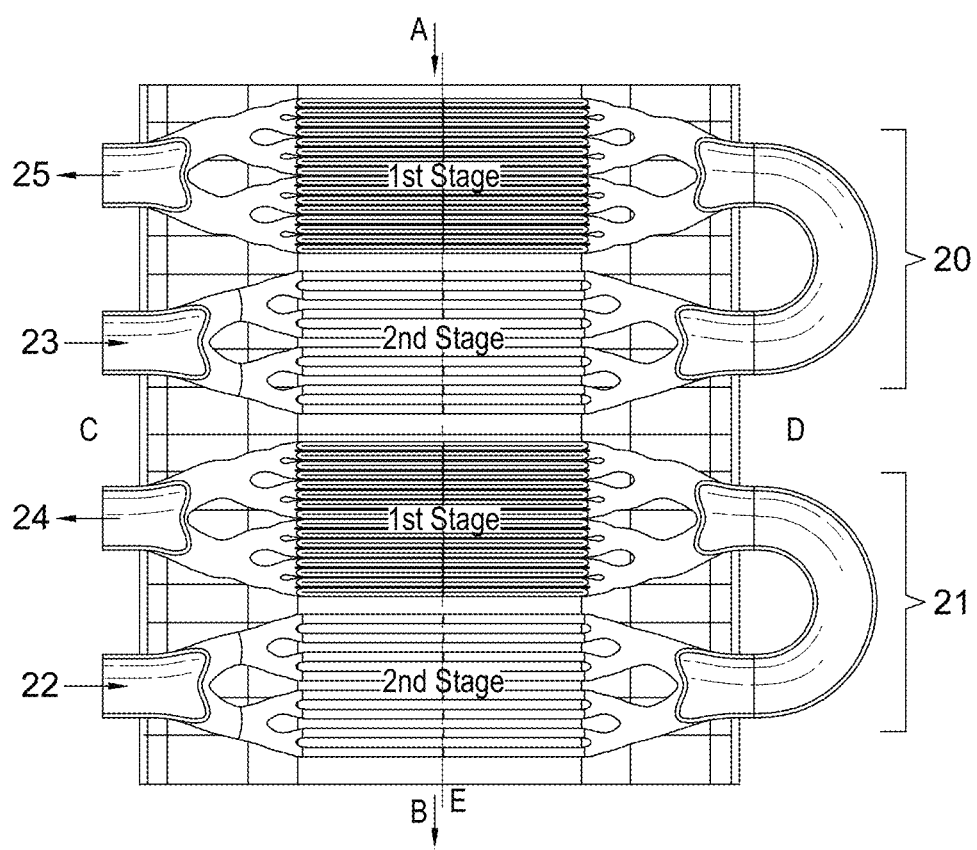
FIG. 5B shows an example of a multiple-stage parallel fractal heat exchanger.

FIG. 5B represents another example of a multiple-stage heat exchanger. In this example, two two-stage fractal heat exchangers are connected in "parallel". However, the invention is not limited to just two two-stage fractal heat exchangers being disposed in parallel, but encompasses more than two. Furthermore, it is also envisaged that two or more multiple-stage fractal heat exchangers of any number of stages (as described in relation to FIG. 5A) can be stacked in parallel. In this configuration, the hot fluid flow paths of each heat exchanger are not interconnected. This example basically describes a number of separate heat exchangers stacked together. However, as denoted by arrows A and B, a cold fluid flows through the first and second stages of the first heat exchanger 20 and then subsequently through the first and second stages of the second heat exchanger 21. In this sense, although there is no hot fluid flow path flowing continuously from the inlet 22 of the second heat exchanger 21 to the outlet 25 of the first heat exchanger, both heat exchangers 20 and 21 are exposed to the same cold fluid flow path. In this way, this example shares some of the benefits of the examples shown in previous figures. It will be appreciated that the cold flow becomes warmer as it progresses through each of the first 20 and second 21 heat exchangers respectively. This means that, when the coldest part of the cold flow meets the first stage of the first heat exchanger, the hot flow from inlet 23 of the first heat exchanger 20 has been already cooled in the second stage of the first heat exchanger before it reaches the first stage. Similarly, the hottest part of the flow at the hot inlets 22 and 23 of the second and first heat exchangers respectively are not exposed to the coldest part of the cold flow. Whilst the thermal gradients in the parallel stage arrangement may not be as low as in the series stage arrangement, it will be appreciated that the pressure drop in the hot flow in the parallel stage arrangement will be considerably lower than that of in the series stage arrangement. The choice of which of these two arrangements to be utilised will therefore depend on the importance of these two factors in a specific application. It is further envisaged that a heat exchanger structure comprising both of these arrangements may be used.

Although particular flow paths have been described in this application as "hot" or "cold" flow paths, it is to be understood that these terms are illustrative, and that the actual relative temperatures of the flow paths may be reversed, such that the colder fluid flows through the herein named "hot fluid flow path" fractal channels and that the hotter fluid through the "cold fluid flow path". The application and particularly the various flow channels/paths are not limited by the definitions of "hot" and/or "cold".

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:
1. A heat exchanger system, comprising:
a plurality of fractal heat exchanger stages arranged adjacent to one another and which are configured to receive a first fluid, and a shell that encloses all of the plurality of fractal heat exchanger stages and which is configured to receive a second fluid to exchange heat with the first fluid;

wherein each of the fractal heat exchanger stages comprises:

a main inlet channel on a first side of the respective stage, the main inlet channel diverging into a plurality of smaller first inlet channels, each of the first inlet channels diverging into a plurality of smaller second inlet channels, a plurality of central channels, the main inlet channel being fluidically connected to a first side of the plurality of central channels via the inlet channels, and a main outlet channel on a second side of the respective stage which is opposite the first side, the plurality of central channels converging into the main outlet channel;

wherein one of the main inlet channels of the plurality of fractal heat exchanger stages is a primary inlet;

wherein one of the main outlet channel of the plurality of fractal heat exchanger stages other than the stage corresponding to the primary inlet is a primary outlet; and wherein each of the main outlet channels other than the primary outlet is connected to one of the main inlet channels other than the primary inlet, such that adjacent stages of the plurality of fractal heat exchanger stages are connected in series between the primary inlet and the primary outlet.

2. The heat exchanger system of claim 1, wherein each of the main inlet channels is located on an opposite side of the heat exchanger system relative to the main inlet channel of an adjacent stage of the plurality of fractal heat exchanger stages.

3. The heat exchanger system of claim 1, wherein the plurality of central channels are parallel to one another.

4. The heat exchanger system of claim 1, wherein each of the connected main inlets and main outlets are connected via a bent duct.

5. The heat exchanger system of claim 1, wherein the shell defines a second fluid flow path (A, B), the second fluid flow path extending at an angle relative to a longitudinal axis of the plurality of central channels.

6. The heat exchanger system of claim 1, wherein the shell defines a second fluid flow path (A, B), the second fluid flow path extending perpendicular to a longitudinal axis of the plurality of central channels.

7. The heat exchanger system of claim 1, wherein the first fluid is a hot fluid and the second fluid is a cold fluid.

* * * * *